United States Patent
Merfeld et al.

(10) Patent No.: US 7,214,432 B2
(45) Date of Patent: May 8, 2007

(54) COATING COMPOSITIONS, THEIR PREPARATION, AND COATED ARTICLES MADE THEREFROM

(75) Inventors: Glen David Merfeld, Loudonville, NY (US); Rainer Koeniger, Clifton Park, NY (US); Ali Ersin Acar, Clifton Park, NY (US); Paul Dean Sybert, Evansville, IN (US); Zhaohui Su, Jilin (CN)

(73) Assignee: General Electric Company, Niskayuna, NY (US)

( * ) Notice: Subject to any disclaimer, the term of this patent is extended or adjusted under 35 U.S.C. 154(b) by 227 days.

(21) Appl. No.: 10/676,892

(22) Filed: Sep. 30, 2003

(65) Prior Publication Data

US 2005/0070643 A1   Mar. 31, 2005

(51) Int. Cl.
| | |
|---|---|
| B32B 27/36 | (2006.01) |
| C08L 67/02 | (2006.01) |
| C08G 63/181 | (2006.01) |
| C08G 63/19 | (2006.01) |
| C08G 63/66 | (2006.01) |

(52) U.S. Cl. ............... 428/412; 428/480; 428/524; 525/398; 525/437; 525/441; 525/443; 525/472; 528/272; 528/300; 528/301; 528/302; 528/308; 528/308.6; 528/308.7; 528/176; 528/194; 528/195

(58) Field of Classification Search ............ None
See application file for complete search history.

(56) References Cited

U.S. PATENT DOCUMENTS

| | | | | |
|---|---|---|---|---|
| 3,460,961 A | * | 8/1969 | Markhart et al. | 428/216 |
| 4,556,606 A | * | 12/1985 | Olson | 428/412 |
| 4,786,708 A | * | 11/1988 | Serini et al. | 528/176 |
| 5,037,903 A | * | 8/1991 | Parker | 525/438 |
| 5,210,155 A | | 5/1993 | Yezrielev et al. | |
| 5,360,647 A | * | 11/1994 | Sumida | 428/216 |
| 5,387,639 A | * | 2/1995 | Sybert et al. | 524/537 |
| 5,422,213 A | * | 6/1995 | Yu et al. | 430/60 |
| 5,580,660 A | | 12/1996 | Witte et al. | |
| 5,777,009 A | * | 7/1998 | Pan et al. | 524/164 |
| 5,916,997 A | * | 6/1999 | Webb et al. | 528/194 |
| 6,143,839 A | * | 11/2000 | Webb et al. | 525/439 |
| 6,228,910 B1 | * | 5/2001 | Shakhnovich | 524/88 |
| 6,265,522 B1 | * | 7/2001 | Brunelle et al. | 528/194 |
| 6,291,589 B1 | * | 9/2001 | Brunelle et al. | 525/165 |
| 6,294,647 B1 | * | 9/2001 | Brunelle et al. | 528/486 |
| 6,306,507 B1 | * | 10/2001 | Brunelle et al. | 428/423.7 |
| 6,538,065 B1 | * | 3/2003 | Suriano et al. | 525/182 |
| 6,559,270 B1 | * | 5/2003 | Siclovan et al. | 528/196 |
| 6,583,256 B2 | * | 6/2003 | Vollenberg et al. | 528/196 |
| 6,596,843 B2 | * | 7/2003 | Brunelle et al. | 528/486 |
| 6,610,409 B2 | * | 8/2003 | Pickett et al. | 428/423.7 |
| 6,627,303 B1 | * | 9/2003 | Gallucci et al. | 428/212 |
| 6,689,474 B2 | * | 2/2004 | Pickett et al. | 428/423.7 |
| 6,812,320 B2 | * | 11/2004 | Silva et al. | 528/198 |
| 6,861,482 B2 | * | 3/2005 | Brunelle et al. | 525/439 |
| 7,115,677 B2 | * | 10/2006 | Harashina et al. | 523/205 |
| 2001/0016626 A1 | * | 8/2001 | Vollenberg et al. | 525/165 |
| 2002/0026028 A1 | | 2/2002 | Epple et al. | |
| 2002/0039657 A1 | * | 4/2002 | Brunelle et al. | 428/423.7 |
| 2003/0072945 A1 | | 4/2003 | Pickett et al. | |
| 2003/0175488 A1 | * | 9/2003 | Asthana et al. | 428/212 |
| 2003/0180542 A1 | * | 9/2003 | Pickett et al. | 428/423.7 |
| 2003/0195325 A1 | * | 10/2003 | Silva et al. | 528/196 |
| 2003/0207123 A1 | * | 11/2003 | Brunelle et al. | 428/423.7 |
| 2003/0216539 A1 | * | 11/2003 | Siclovan et al. | 528/272 |
| 2005/0049369 A1 | * | 3/2005 | O'Neill et al. | 525/439 |
| 2005/0159542 A1 | * | 7/2005 | Acar et al. | 525/40 |
| 2005/0159543 A1 | * | 7/2005 | Acar et al. | 525/48 |
| 2005/0159577 A1 | * | 7/2005 | Davis et al. | 528/198 |
| 2005/0288406 A1 | * | 12/2005 | Gallucci et al. | 524/115 |
| 2006/0004152 A1 | * | 1/2006 | Acar et al. | 525/439 |
| 2006/0093826 A1 | * | 5/2006 | Koeniger et al. | 428/411.1 |
| 2006/0160961 A1 | * | 7/2006 | O'Neil et al. | 525/439 |

FOREIGN PATENT DOCUMENTS

JP   7316471   12/1995

OTHER PUBLICATIONS

SM Cohen et al., "Transparent Ultraviolet-Barrier Coatings", Journal of Polymer Science, Part A-1, vol. 9, pp. 3263-3299, 1971.
Copending U.S. Appl. No. 10/639,998, filed Aug. 12, 2003, by G. A. O'Neil et al., entitled "Method for Preparing Copolyestercarbonates".
PCT International Search Report dated Dec. 27, 2005.

* cited by examiner

Primary Examiner—Vivian Chen
(74) Attorney, Agent, or Firm—Andrew J. Caruso; William E. Powell, III

(57) ABSTRACT

A coating composition comprising components A, B and optionally C, wherein component A comprises at least one hydroxy-terminated polyarylate. Component B is an organic species which can react with the hydroxy terminal groups of component A, and component C is a catalyst or mixture of catalysts. The hydroxy-terminated polyarylates are prepared by a solution polymerization method.

35 Claims, No Drawings

COATING COMPOSITIONS, THEIR PREPARATION, AND COATED ARTICLES MADE THEREFROM

This invention was made with Government support under contract number DACA72-02-C-0025, awarded by U.S. Army Corp of Engineers. The Government has certain rights in the invention.

BACKGROUND OF THE INVENTION

This invention relates to coating compositions comprising polyarylates, the methods of preparing polyarylates and coated articles prepared using the coating compositions of the present invention.

Modern commerce and technology frequently employ organic coatings to shield various sensitive substrates from the harmful effects of the environment. Many such coatings are limited by long-term color instability, a limitation which is evidenced by a yellowing of the organic coating over time. Yellowing due to a coating's constituent polymeric components may be caused by the action of ultraviolet (UV) radiation. Another frequently encountered problem with organic coatings based on polymeric materials is poor resistance of the coating to chemicals and solvents after its application. Coatings which are tough, chemically resistant and "weatherable" (i.e. resistant to the effects of sunlight and other environmental conditions) are highly prized and diligently sought after.

Generally it has been observed that there is a tradeoff between weatherability and toughness in the performance of the commercial coating compositions known in the art. One solution to this problem has been the combination of extremely tough epoxies with polyesters to provide coatings with improved weatherability. Similarly acrylates, which are known to exhibit good weatherabiliy, but poor toughness, have been combined with polyester resins to improve their toughness. Compositions containing polyoxymethylene resins and various additives to improve toughness or impact strength are also known.

Certain types of polyarylates, known for their good weatherability and chemical resistance, have been found in the instant invention to be useful in the preparation of novel coating compositions having excellent scratch resistance and other properties. Up to the present, hydroxy-terminated polyarylates units have been prepared via interfacial polymerization methods. Despite recent strides in interfacial polyarylate synthesis, such interfacial methods are limited by an inability to control the molecular weight of the growing polyarylate chains. Typically the interfacial polymerization method provides polyarylates with high molecular weights, materials which may not be suitable for certain coating applications.

It remains of interest therefore, to develop coating compositions that demonstrate scratch resistance, toughness, chemical resistance and weatherability, suitable for application over various types of substrates in a wide variety of applications. There is also a need for synthetic methodology to prepare polymers comprising resorcinol chain members, having controlled molecular weight. The instant invention addresses these and other challenges and provides new and highly efficient solutions to them.

BRIEF SUMMARY OF THE INVENTION

In one aspect, the present invention provides a coating composition comprising components A, B and optionally C:

(i) component A comprising at least one polyarylate, said polyarylate comprising structural units having formula I

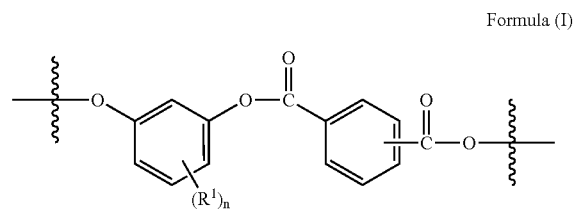

Formula (I)

wherein $R^1$ is independently at each occurrence a $C_1$–$C_{12}$ alkyl radical and n is 0–3, said polyarylate further comprising phenolic hydroxy groups;

(ii) component B comprising at least one "organic species" comprising one or more functional groups, said functional groups being chemically reactive with the phenolic hydroxy groups of the polyarylate of component A; and optionally (iii) component C one or more catalysts which promote chemical reaction between the polyarylate hydroxyl groups of component A and the "organic species" of component B.

In another aspect, the present invention provides powder coatings comprising at least one polyarylate, said polyarylate comprising structural units having formula I. In yet another aspect, the present invention provides a method for preparing polyarylates comprising structural units having formula I. In still another aspect, the present invention provides a coated article comprising a coating layer prepared from the coating composition of the invention.

DETAILED DESCRIPTION OF THE INVENTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "aliphatic radical" refers to a radical having a valence of at least one and consisting of a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene, methoxy, ethoxy, thiomethyl, thioethyl, and the like.

As used herein the term "cycloaliphatic radical" refers to a radical having a valance of at least one and comprising an array of atoms which is cyclic but which is not aromatic, and which does not further comprise an aromatic ring. The array may include heteroatoms such as nitrogen, sulfur and oxygen or may be composed exclusively of carbon and hydrogen. Examples of cycloaliphatic radicals include cyclopropyl, cyclopentyl cyclohexyl, 2-cyclohexylethy-1-yl, tetrahydrofuranyl and the like.

As used herein the term "aromatic radical" refers to a radical having a valence of at least one and comprising at least one aromatic ring. Examples of aromatic radicals include phenyl, pyridyl, furanyl, thienyl, naphthyl, phenylene, and biphenyl. The term includes groups containing both aromatic and aliphatic components, for example a benzyl group, a phenethyl group or a naphthylmethyl group. The term also includes groups comprising both aromatic and cycloaliphatic groups for example 4-cyclopropylphenyl and 1,2,3,4-tetrahydronaphthalen-1-yl.

As noted, the present invention provides a coating composition comprising components A, B and optionally C, wherein component A comprises at least one hydroxy-terminated polyarylate having structural units of formula I, component B is an organic species which can react with the hydroxy terminal groups of component A, and component C is a catalyst or mixture of catalysts.

Typically component A comprises a hydroxy-terminated polyarylate comprising arylate polyester chain members. Said chain members comprise at least one dihydroxy-substituted aromatic hydrocarbon moiety in combination with at least one aromatic dicarboxylic acid moiety. In one particular embodiment the dihydroxy-substituted aromatic hydrocarbon moiety is derived from a 1,3-dihydroxybenzene moiety, illustrated in the structural moiety of formula (II), commonly referred to throughout this specification as resorcinol or a resorcinol moiety. In formula (II), $R^2$ is at least one of $C_{1-12}$ alkyl or halogen, and n is 0–3. Resorcinol or resorcinol moiety as used within the context of the present invention should be understood to include both unsubstituted 1,3-dihydroxybenzene and substituted 1,3-dihydroxybenzenes unless explicitly stated otherwise. The concentration of component A of formula I, in the coating composition is in the range of about 1 to about 99 percent by weight of the coating composition. In one embodiment, the concentration of structural units of formula II in component A is in a range between about 0.01 and about 50 percent by weight of the total weight of the coating composition. In another embodiment, the concentration of structural units of formula II in component A is in a range between about 0.1 and about 20 percent by weight of the total weight of the coating composition. In yet another embodiment the concentration of structural units II in component A is in a range between about 0.1 and about 10 percent by weight of the total weight of the coating composition.

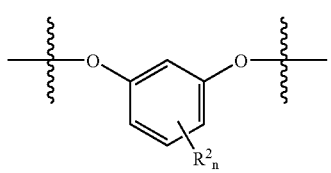

Formula (II)

Suitable dicarboxylic acid residues include aromatic dicarboxylic acid residues derived from monocyclic moieties, including isophthalic acid, terephthalic acid, or mixtures of isophthalic and terephthalic acids, or from polycyclic moieties. In various embodiments, the aromatic dicarboxylic acid residues are derived from mixtures of isophthalic and terephthalic acids as typically illustrated in the structural moiety of formula (III).

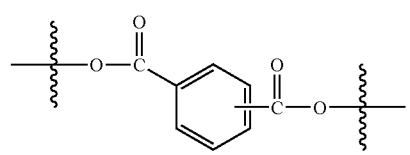

Formula (III)

Therefore, in one particular embodiment, the present invention provides coating compositions comprising hydroxy-terminated polyarylates, said polyarylates comprising resorcinol-arylate polyester chain members as typically illustrated in the structural moiety of formula (I) wherein $R^1$ and n are as previously defined.

The hydroxy-terminated polyarylates present in component A may be prepared by a variety of methods which include the interfacial reaction of a dihydroxy-substituted aromatic hydrocarbon with an aromatic diacid chloride. Methods for carrying out for such interfacial reactions to produce hydroxy-terminated polyarylates are disclosed in copending U.S. application Ser. No. 120,582 and in U.S. Pat. Nos. 6,306,507 and 6,294,647. Through careful control of the reaction parameters during the interfacial preparation of the hydroxy-terminated polyarylates, poor thermal stability which is sometimes observed in such polyarylates may be overcome.

Typically, control of the molecular weight of the hydroxy-terminated polyarylates has proven difficult to achieve. In the absence of a chain-stopper, the molecular weight of the hydroxy-terminated polyarylate produced interfacially is relatively insensitive to stoichiometric control. This is particularly true when the dihydroxy-substituted aromatic compound and its salts are highly insoluble in the solvent forming the organic phase of the interfacial reaction mixture. Earlier attempts to control polyarylate molecular weight led to the discovery that by increasing the molar ratio of the dihydroxy-substituted aromatic compound to the diacid chloride employed, and by decreasing the amount of water present in the interfacial reaction of the dihydroxy-substituted aromatic compound with the diacid chloride, enhanced control of the molecular weight of the hydroxy-terminated polyarylate could be achieved without the use of an end capping agent. A failure to control the molecular weight of the hydroxy-terminated polyarylate limits the utility of the hydroxy-terminated polyarylate in the preparation of coating formulations due to the higher glass transition temperatures (Tg) and lower concentration of hydroxyl end groups of the higher molecular weight polyarylates relative to oligomeric polyarylates.

It has been discovered within the context of the present invention that excellent control over the molecular weight of the hydroxy terminated polyarylate can achieved when the polyarylate is prepared in a reaction medium which is essentially homogeneous with respect to the organic reactants. Thus, in one aspect, the present invention provides a method for preparing polyarylates of almost any molecular weight in a process in which reaction of one or more dihydroxy-substituted aromatic hydrocarbon moieties with at least one dicarboxylic acid moiety is carried out under conditions which are essentially homogeneous with respect to the organic reactants.

The novel method disclosed herein may be used for preparing a wide variety of hydroxy-substituted polyarylates of both high and low molecular weights and widely varying structural units. By "high molecular weight" it is meant that the polyarylate has a weight average molecular weight (Mw) in excess of 15,000 grams per mole as measured by gel permeation chromatography (GPC) using polystyrene (PS) molecular weight standards. By "low molecular weight" it is meant that the polyarylate has a weight average molecular weight of 15,000 grams per mole or less as measured by gel permeation chromatography (GPC) using polystyrene (PS) molecular weight standards. For purposes of this disclosure, the terms "oligomeric polyarylate" and "low molecular weight polyarylate" are used interchangeably.

The novel method used to prepare hydroxy-terminated polyarylates according to the method of the present invention comprises contacting in a reaction mixture at least one dihydroxy-substituted aromatic moiety, at least one organic base, and at least one dicarboxylic acid dichloride (for convenience referred to as a "diacid chloride"), in at least one inert organic solvent.

In one embodiment of the present invention the overall process takes the form of individual steps. Thus, in a first step, at least one dihydroxy-substituted aromatic hydrocarbon moiety is mixed with at least one organic base in at least one inert organic solvent to form a mixture. Typically, the mixture comprising the dihydroxy-substituted aromatic hydrocarbon moiety, the organic base, and the inert organic solvent is substantially homogeneous. In the context of the mixture formed by the dihydroxy-substituted aromatic hydrocarbon moiety, the organic base, and the inert organic solvent "substantially homogeneous" means that at least about 50 percent, preferably at least about 75 percent, and still more preferably at least about 90 percent of the dihydroxy-substituted aromatic hydrocarbon moiety is dissolved in the organic solvent.

Suitable dihydroxy-substituted aromatic hydrocarbons for preparing hydroxy-terminated polyarylates include those represented by the formula (IV)

(IV)

wherein D is a divalent aromatic radical. In some embodiments D has the structure of formula (V);

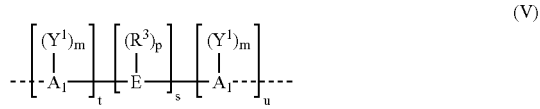

(V)

wherein each $A^1$ independently represents an aromatic group such as phenylene, biphenylene, naphthylene, and the like. E may be an alkylene or alkylidene group such as methylene, ethylene, ethylidene, propylene, propylidene, isopropylidene, butylene, butylidene, isobutylidene, amylene, amylidene, isoamylidene, and the like. Where E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage such as sulfide, sulfoxide, sulfone, and the like; or a phosphorus-containing linkage such as phosphinyl, phosphonyl, and the like. In addition, E may be a cycloaliphatic group (e.g., cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.); a sulfur-containing linkage, such as sulfide, sulfoxide or sulfone; a phosphorus-containing linkage, such as phosphinyl, phosphonyl; an ether linkage; a carbonyl group; a tertiary nitrogen group; or a silicon-containing linkage such as silane or siloxy. $R^3$ is independently at each occurrence a monovalent hydrocarbon group such as alkyl, aryl, aralkyl, alkaryl, or cycloalkyl. $Y^1$ is independently at each occurrence an inorganic atom such as halogen (fluorine, bromine, chlorine, iodine); an inorganic group such as nitro; an organic group such as alkenyl, allyl, or $R^3$ above, or an oxy group such as OR. The letter "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

In the dihydroxy-substituted aromatic hydrocarbon compound in which D is represented by formula (V) above, when more than one $Y^1$ substituent is present, they may be the same or different. The same holds true for the $R^3$ substituent. Where "s" is zero in formula (V) and "u" is not zero, the aromatic groups $A^1$ are directly joined with no intervening alkylidene or other bridge. The positions of the hydroxyl groups and $Y^1$ on the aromatic groups $A^1$ can be varied in the ortho, meta, or para positions with respect to the positions of the hydroxy groups (not shown in figure V but indicated by the dashed lines) and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" are each one; both aromatic groups $A^1$ are unsubstituted phenylene radicals; and E is an alkylidene group such as isopropylidene. In some particular embodiments both aromatic groups $A^1$ are p-phenylene, although both may be o- or m-phenylene or one o- or m-phenylene and the other p-phenylene.

Some illustrative, non-limiting examples of dihydroxy-substituted aromatic hydrocarbons represented by formula (V) include the dihydroxy-substituted aromatic hydrocarbons disclosed by name or formula (generic or specific) in U.S. Pat. No. 4,217,438. Some particular examples of dihydroxy-substituted aromatic hydrocarbons include 4,4'-(3,3,5-trimethylcyclohexylidene)diphenol; 4,4'-bis(3,5-dimethyl)diphenol; 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (commonly known as bisphenol A); 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,6-dihydroxy naphthalene; hydroquinone; resorcinol; and $C_{1-12}$ alkyl-substituted resorcinols.

The term "alkyl" as used in the various embodiments of the present invention is intended to designate both normal alkyl, branched alkyl, aralkyl, cycloalkyl, and bicycloalkyl radicals. In various embodiments, normal and branched alkyl radicals are those containing from 1 to about 12 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments cycloalkyl radicals are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those containing from 6 to 18 ring carbon atoms. Some illustrative non-limiting examples of these aryl radicals include phenyl, biphenyl, and naphthyl.

In one embodiment of the present invention, the dihydroxy-substituted aromatic hydrocarbon is a resorcinol moiety having formula VI wherein $R^2$ and n are defined as in structure II.

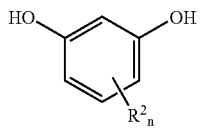

Formula (VI)

Alkyl groups, if present, are preferably straight-chain or branched alkyl groups, and are most often located in the position "ortho" to both oxygen atoms, although other ring locations are contemplated. Suitable $C_{1-12}$ alkyl groups include methyl, ethyl, n-propyl, isopropyl, butyl, iso-butyl, t-butyl, nonyl, and decyl, with methyl being particularly preferred. Suitable halogen groups are bromo, chloro, and fluoro groups. The value for n may be 0–3, preferably 0–2, and more preferably 0–1. A preferred resorcinol moiety is 2-methylresorcinol. The most preferred resorcinol moiety is an unsubstituted resorcinol moiety in which n is zero.

The organic base serves both to solubilize the dihydroxy-substituted aromatic moiety, and to promote the polymerization reaction of the dihydroxy-substituted aromatic moiety and dicarboxylic acid dichlorides. The organic base may be present in an amount corresponding to between about 0.9 and about 10, and preferably between about 0.9 to 2.5 equivalents relative to the dihydroxy-substituted aromatic moiety. Suitable organic bases comprise tertiary organic amines.

Suitable tertiary organic amines are illustrated by triethylamine, N,N-dimethyl-N-butylamine, N,N-diisopropyl-N-ethylamine, N,N-diethyl-N-methylamine; 2,2,6,6-tetramethylpiperidine, and mixtures thereof. Additional examples of suitable tertiary amines include $C_1$–$C_6$ N-alkylpyrrolidines, such as N-ethylpyrrolidine; $C_1$–$C_6$ N-alkylpiperidines, such as N-ethylpiperidine, N-methylpiperidine, and N-isopropylpiperidine; $C_1$–$C_6$ N-alklymorpholines, such as N-methylmorpholine and N-isopropyl-morpholine; $C_1$–$C_6$ N-alkyldihydroindoles, $C_1$–$C_6$ N-alkyldihydroisoindoles, $C_1$–$C_6$ N-alkyltetrahydroquinolines, $C_1$–$C_6$ N-alkyltetrahydroisoquinolines, $C_1$–$C_6$ N-alkylbenzomorpholines, 1-azabicyclo-[3.3.0]-octane, quinuclidine, $C_1$–$C_6$ N-alkyl-2-azabicyclo[2.2.1]octanes, $C_1$–$C_6$ N-alkyl-2-azabicyclo[3.3.1]nonanes, and $C_1$–$C_6$ N-alkyl-3-azabicyclo[3.3.1]nonanes; N,N,N',N'-tetraalkylalkylenediamines such as N,N,N',N'-tetraethyl-1,6-hexanediamine. Particularly preferred tertiary amines are triethylamine and N-ethylpiperidine.

Additional agents which may also be added to both to solubilize the dihydroxy-substituted aromatic moiety, and to promote the polymerization reaction of the dihydroxy-substituted aromatic moiety and dicarboxylic acid dichlorides, include quaternary ammonium salts, quaternary phosphonium salts, and mixtures thereof.

Suitable quaternary ammonium salts include tetraethylammonium bromide, tetraethylammonium chloride, tetrapropylammonium bromide, tetrapropylammonium chloride, tetrabutylammonium bromide, tetrabutylammonium chloride, methyltributylammonium chloride, benzyltributylammonium chloride, benzyltriethylammonium chloride, benzyltrimethylammonium chloride, trioctylmethylammonium chloride, cetyldimethylbenzylammonium chloride, octyltriethylammonium bromide, decyltriethylammonium bromide, lauryltriethylammonium bromide, cetyltrimethylammonium bromide, cetyltriethylammonium bromide, N-laurylpyridinium chloride, N-laurylpyridinium bromide, N-heptylpyridinium bromide, tricaprylylmethylammonium chloride (sometimes known as ALIQUAT 336), methyl tri-$C_8$–$C_{10}$-alkyl-ammonium chloride (sometimes known as ADOGEN 464); and N,N,N',N',N'-pentaalkyl-alpha, omega-diammonium salts such as are disclosed in U.S. Pat. No. 5,821,322.

Suitable quaternary phosphonium salts are illustrated by tetrabutylphosphonium bromide, benzyltriphenylphosphonium chloride, triethyloctadecylphosphonium bromide, tetraphenylphosphonium bromide, triphenylmethylphosphonium bromide, trioctylethylphosphonium bromide, and cetyltriethylphosphonium bromide.

Suitable inert organic solvents used in the preparation of hydroxy-terminated polyarylates according to the method of the present invention include halogenated aliphatic solvents, halogenated aromatic solvents, aliphatic ketone solvents, aliphatic ester solvents, aliphatic ether solvents, aromatic ether solvents, aliphatic amide solvents, aliphatic hydrocarbon solvents, and aromatic hydrocarbon solvents. The inert organic solvents may be used singly or as mixtures of solvents. Halogenated aliphatic solvents are illustrated by dichloromethane, chloroform, trichloroethylene, tetrachloroethane, 1,2-dichloroethane and the like. Halogenated aromatic solvents are illustrated by chlorobenzene, ortho-dichlorobenzene, fluorobenzene, chlorotoluene, chloroxylene, chloronaphthalene, and the like. Aliphatic ketone solvents are illustrated by acetone, 2-butanone, cyclohexanone, dihydroisophorone, dihydrophorone, and the like. Aliphatic ester solvents are illustrated by methyl acetate, ethyl acetate, propyl acetate, and the like. Aliphatic ether solvents are illustrated by diethyl ether, tetrahydrofuran, dioxane, and the like. Aromatic ether solvents are illustrated by anisole, diphenyl ether, and the like. Aliphatic amide solvents are illustrated by N,N-dimethylormaide; N,N-dimethyacetamide, N-methyl-2-pyrrolidinone, and the like. Aliphatic hydrocarbon solvents are illustrated hexane, cyclohexane, isooctane, and the like. Aromatic hydrocarbon solvents are illustrated by toluene, xylene, ethylbenzene, and the like. An especially preferred solvent is dichloromethane.

In a second step of the method used in the preparation of hydroxy-terminated polyarylates according to the present invention, at least one dicarboxylic acid dichloride (diacid chloride) is added to the mixture formed in the first step, said mixture comprising at least one dihydroxy-substituted aromatic hydrocarbon moiety, at least one organic base, and at least one inert organic solvent. One or more diacid chlorides are added in a molar amount such that the molar amount of diacid chloride in the mixture is stoichiometrically deficient relative to the total molar amount of dihydroxy-substituted aromatic hydrocarbon moieties, to form a reaction mixture.

Typically, the diacid chlorides added are principally aromatic diacid chlorides, however aliphatic diacid chlorides may also be employed. Suitable aromatic diacid chlorides are represented by monocyclic diacid chlorides, for example isophthaloyl dichloride, terephthaloyl dichloride, and mixtures of isophthaloyl and terephthaloyl dichlorides. Suitable polycyclic diacid chlorides include diphenyl dicarboxylic acid dichloride, diphenylether dicarboxylic acid dichloride, and naphthalenedicarboxylic acid dichloride. Naphthalene-2,6-dicarboxylic acid dichloride is a preferred polycyclic diacid chloride. As noted, mixtures of various diacid chlorides may be employed, for example mixtures of monocyclic and polycyclic aromatic dicarboxylic acid dichlorides. In one embodiment the dicarboxylic acid dichloride comprises a mixtures of isophthaloyl and terephthaloyl dichlorides. The use of a mixture of isophthaloyl and terephthaloyl dichlorides is conveniently represented by Formula VII.

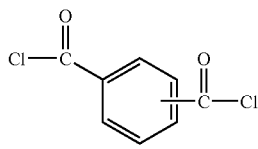

Formula (VII)

It should be noted that formula VII merely indicates that either or both of isophthaloyl and terephthaloyl dichlorides may be present. In preferred embodiments the dicarboxylic acid dichlorides comprise mixtures of isophthaloyl and terephthaloyl dichloride in a molar ratio of isophthaloyl to terephthaloyl dichloride of about 0.2–5:1 and preferably about 0.8–2.5:1.

In one embodiment the present invention provides a novel method for preparing a hydroxy-substituted polyarylate wherein said hydroxy-terminated polyarylate comprises structural units derived from at least one diol having structure IV and at least one aromatic diacid chloride, said hydroxy-substituted polyarylate further comprising structural units ("chain members") derived from aliphatic dicarboxylic acids and/or aliphatic diols. Structural units derived from aliphatic dicarboxylic acids and/or aliphatic diols are referred to herein as "soft-block" segments.

The term soft-block as used herein, indicates that some segments of these particular polymers are made from non-aromatic monomer units. Such non-aromatic monomer units are generally aliphatic and are known to impart flexibility to the soft-block-containing polymers. In one embodiment, a hydroxy-terminated polyarylate may be prepared using the method of the present invention said hydroxy-terminated polyarylate comprising structural units represented by formulae (II), (III), and (VIII):

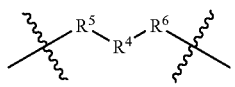

Formula (VIII)

wherein $R^4$ is a $C_2$–$C_{100}$ aliphatic radial, or a $C_4$–$C_{20}$ cycloaliphatic radical and $R^5$ and $R^6$ each independently represent a bond,

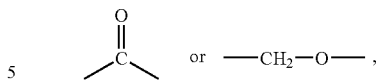

wherein the first (on left) of the two structures indicated represents a carbonyl group with two open positions for bond formation, and the second (on right) of the two structures represents a an oxymethylene group with two open positions for bond formation. In various embodiments $R^4$ is a $C_{2-20}$ straight chain alkylene radical, $C_{3-10}$ branched alkylene radical, $C_{4-10}$ cycloalkylene radical, or a $C_7$–$C_{20}$ bicycloalkylene radical. Still other embodiments provide a composition wherein $R^4$ represents $C_{3-10}$ straight-chain alkylene or $C_6$-cycloalkylene. In one embodiment, $R^4$ comprises structural units having formula (IX):

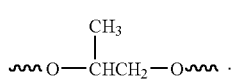

Formula (IX)

In yet another embodiment, $R^4$ comprises structural units having formula (X):

Formula (X)

In various embodiments of hydroxy-terminated polyarylates containing soft-block chain members, n in formula (II) is zero. The concentration of the soft block units in the polyarylate chain is in a range between about 0.01% to about 50%, more preferably about 0.1% to about 20% and most preferably about 0.1% to about 10% by weight of the total weight of the hydroxy-terminated polyarylate.

Typically, once the dicarboxylic acid dichloride is added to the reaction mixture, the reaction mixture is agitated under inert atmosphere until the reaction is complete and all the dicarboxylic acid dichlorides have reacted. In one embodiment nitrogen gas may be introduced inside the reactor to provide an inert atmosphere.

Typically, in a subsequent step in the solution polymerization process, the reaction mixture is quenched with an inorganic acid, for example, hydrochloric acid. The organic layer is then washed several times with water, and the product, hydroxy-terminated polyarylate may be isolated by precipitation with an "antisolvent" (e.g. methanol) or the inert solvent may be removed by steam distillation or other conventional means. In order to characterize more reliably the product hydroxy-terminated polyarylate, it is typically dried at elevated temperature for a period of 24 hours or so under vacuum prior to analysis by such techniques as NMR.

The polyarylate product prepared using the method described in the preceding sections may be characterized by Gel Permeation Chromatography (GPC) and Differential Scanning Calorimetry (DSC). Molecular weights are reported as number average ($M_n$) molecular weight in grams per mole (g/mole) or weight average molecular weight (Mw) and are determined by gel permeation chromatography (GPC) using polystyrene (PS) molecular weight standards. The molecular weights may also be determined by nuclear magnetic resonance (NMR). The number average molecular weight of the polyarylate prepared by the solution polymerization method of the present invention is typically in a range between about 500 and about 55,000 grams per mole.

In one embodiment the coating composition of the present invention comprises a hydroxy-terminated polyaryate having a number average molecular weight in a range between about 500 and about 5000 grams per mole. In another embodiment the coating composition of the present invention comprises a hydroxy-terminated polyaryate having a number average molecular weight in a range between about 2000 and about 5000 grams per mole. In yet another embodiment the coating composition of the present invention comprises a hydroxy-terminated polyaryate having a number average molecular weight in a range between about 500 and about 2500 grams per mole. Typically, The preferred range of $M_n$ of oligomeric polyarylate used in making the coating composition is about 500 to about 5000 grams per mole.

Glass Transition Temperatures (Tg) of oligomeric polyarylates were measured by differential scanning calorimetry (DSC).

As noted, in a primary aspect the present invention provides a coating composition comprising components A, B and optionally C, wherein component A comprises at least one hydroxy-terminated polyarylate having structural units of formula I, component B is an organic species which can react with the hydroxy terminal groups of component A, and component C is a catalyst or mixture of catalysts which promote the reaction between components A and B. Component B comprises at least one organic species having one or more functional groups which may be the same or different, said functional groups being chemically reactive with the phenolic hydroxy groups of the polyarylate of component A. While any functional group capable of reaction with the terminal hydroxy groups of the polyarylate of component A may be employed, the functional groups of component B are typically selected from the group consisting of isocyanates, anhydrides, epoxides, acid chlorides, carboxylic acids, activated carboxylic acid esters, sulfonyl chlorides, amidals, and aminals. In one embodiment, component B comprises at least one melanine-type resin, urea formaldehyde resin, or a combination thereof. In an alternative embodiment, component B comprises an aliphatic polyisocyanate. In one embodiment, component B comprises IPDI-Trimer (isocyanurate of isophorone diisocyanate, commercially known as VESTANAT T 1890). In another embodiment component B comprises epoxy resin precursor a polyglycidyl. In one embodiment component B comprises BPA diglycidyl ether (commercially known as EPON Resin 2002). Typically, the concentration of component B in the disclosed coating composition is in a range between about 1 and about 99 percent by weight of the total weight of the coating composition.

As noted, the coating composition may comprise a component C, a catalyst to promote the reaction, when present between component A and component B, meaning that the presence or absence of component C is optional. Typically, the catalyst is selected from the group consisting of tertiary amines, quaternary ammonium salts, quaternary phosphonium salts, Lewis acids, and mixtures thereof. Typically, component C is present in an amount corresponding to between about 0.00001 and about 10 percent by weight of total weight the coating composition. In one embodiment benzyl trimethylammonium bromide (BTMAB) may be used as a catalyst.

The coating compositions of the present invention may contain one or more co-resins. The term "co-resin" is used to designate a polymeric species which does not fall within the class of materials belonging to the "organic species" of component B because the co-resin does not possess functional groups capable of reaction with the hydroxy groups of component A under conditions typically used for the formation of a coating. The co-resin may have either high or low molecular weight as defined herein. Polymers which are especially well suited for use as co-resins include polycarbonates, polyesters, polyetherimides, polyphenylene ethers, addition polymers and the like. Polyesters are illustrated by poly(alkylene arenedioates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly(cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"). The poly(alkylene arenedioates), poly(ethylene terephthalate) and poly(1,4-butylene terephthalate) are especially preferred in certain coating applications. Suitable addition polymers include homopolymers and copolymers, especially homopolymers of alkenylaromatic compounds, such as polystyrene, including syndiotactic polystyrene, and copolymers of alkenylaromatic compounds with ethylenically unsaturated nitriles, such as acrylonitrile and methacrylonitrile; dienes, such as butadiene and isoprene; and/or acrylic monomers, such as ethyl acrylate. These latter copolymers include the ABS (acrylonitrile-butadiene-styrene) and ASA (acrylonitrile-styrene-alkyl acryl ate) copolymers. Addition polymers as used herein include polyacrylate homopolymers and copolymers including polymers comprising methacrylate-derived structural units.

The coating compositions disclosed herein may further comprise art-recognized additives including organic and inorganic pigments, dyes, impact modifiers, UV screeners, hindered amine light stabilizers, degassing agents, corrosion inhibitors, surface tension modifiers, flame retardants, organic and inorganic fillers, stabilizers and flow aids.

The coating compositions disclosed herein may be prepared through several routes. In some embodiments, the coating compositions may be prepared using an organic solvent base or water base. The coating compositions may also be prepared through a route, which is substantially solvent free, for example, in the form of a power coating.

The solvent based coating compositions comprising a polyarylate of formula I may be prepared through solution coating followed by evaporation. The solvent based coating formulations may be prepared and dissolved in suitable solvents for solvent casting. Typically dimethylacetamide and tetrahydrofuran or a mixture thereof are preferred solvents. However other co-solvents, such as amides (dimethylformamide, methylpyrolidone, etc), esters (ethyl acetate, butyl acetate, etc), ketones (acetone, methyl ethyl ketone, methyl iso-butyl ketone, etc), alcohols (methanol, ethanol, etc.) aromatics (toluene, xylene, etc.), halogenated solvents (dichloromethane, chloroform, etc.) and mixtures thereof may also be employed. The solutions of the coating compositions for solvent casting should be mixed thoroughly prior to film casting onto a substrate. The water based coating compositions have the coating compositions dispersed in the water phase.

The powder coating compositions comprising at least one polyarylate possessing structural units having formula I possess particularly advantageous physical properties for use in powder coatings when the polyarylate possessing structural units having formula I is an oligomeric polyarylate. As noted, polyarylates having almost any molecular weight from low molecular weight oligomers to high molecular weight polymers may be prepared using the novel synthetic procedure disclosed herein which forms one aspect of the instant invention. It should be noted, that the novel process described in detail in preceding sections of this document may be used to prepare oligomeric polyarylates which are in some instances crystalline oligomeric polyarylates. In this respect, performance of dry powder coating formulations comprising oligomeric polyarylates may be enhanced when the polyarylates are in an amorphous rather than crystalline form. Thus in one embodiment, a crystalline oligomeric polyarylate is converted into an amorphous form for use in a coating formulation according to the present invention. In one embodiment, in order to suppress crystallinity, a crystalline oligomeric polyarylate is melt extruded in an extruder thereby producing an amorphous form of the oligomeric polyarylate.

Typically, the components of the powder coating compositions are ground to a powder for dry blending, dry blended to produce a blend. After dry blending, the blend is extruded, ground and sieved to prepare the powder coating formulation, which may be electrostatically deposited on the substrate to be coated to produce a coated substrate. Alternatively, the coating formulation may be "solvent cast", or applied as a dispersion in water on a substrate to produce a coated substrate. The coated substrate may then be cured at a particular temperature for a certain time, or the coated substrate may be subjected to curing under a "cure profile" in which the cure conditions such as temperature, time and the like are varied during the curing process. The properties exhibited by the coating depend on the curing conditions. The optimum curing temperature and time ranges may be determined using the conditions disclosed herein or alternatively curing conditions may be arrived at by screening a modest number of different curing conditions.

The coating formulations disclosed herein have outstanding physical properties which include scratch resistance, chemical resistance, hardness, toughness and weatherability. The chemical resistance, hardness, toughness and weatherability of the coatings prepared using the coating compositions disclosed herein are in many instances superior to coatings prepared using known coating formulations. In one aspect, the coatings prepared from the coating compositions of the present invention show enhanced photostability. Thus, when exposed to UV light, the polyarylate component of the subject coatings undergo photo-Fries reaction to generate hydroxybenzophenone structural units which serve to protect the coating from further photochemical reaction and degradation. The hydroxybenzophenone photoproducts effectively absorb light in the "near UV" range of the spectrum and enhanced photostability is conferred upon the coating thereby. In this manner it is believed that the coatings prepared using the coating compositions of the present invention produce coatings which exhibit enhanced more robust weatherability and increased toughness.

In another embodiment, the present invention comprises coated articles comprising a substrate layer comprising at least one thermoplastic polymer, thermoset polymer, cellulosic material, glass, ceramic, or metal, and at least one coating layer thereon, said coating layer prepared using the coating compositions of the instant invention, said coating layer comprising structural units having formula I. Optionally, the coated articles may further comprise an interlayer, for example an adhesive interlayer, between any substrate layer and any thermally stable polymer coating layer. Coated articles of the invention include, but are not limited to, those which comprise a substrate layer and a coating layer comprising oligomeric polyarylate; those which comprise a substrate layer with a coating layer comprising oligomeric polyarylate on each side of said substrate layer; and those which comprise a substrate layer and at least one coating layer comprising oligomeric polyarylate with at least one interlayer between a substrate layer and a coating layer.

The coated articles produced using the coating compositions of the present invention typically have outstanding initial gloss, improved initial color, weatherability, impact strength, and resistance to organic solvents encountered in their final applications.

The material of the substrate layer in the articles of this invention may be at least one thermoplastic polymer, whether addition or condensation prepared. Condensation polymers include, but are not limited to, polycarbonates, particularly aromatic polycarbonates, polyphenylene ethers, polyetherimides, polyesters (other than those employed for the coating layer, as defined hereinafter), and polyamides. Polycarbonates and polyesters are frequently preferred.

Polyester substrates include, but are not limited to, poly (ethylene terephthalate), poly(1,4-butylene terephthalate), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate).

Suitable addition polymer substrates include homo- and copolymeric aliphatic olefin and functionalized olefin polymers such as polyethylene, polypropylene, poly(vinyl chloride), poly(vinyl chloride-co-vinylidene chloride), poly(vinyl fluoride), poly(vinylidene fluoride), poly(vinyl acetate), poly(vinyl alcohol), poly(vinyl butyral), poly(acrylonitrile), acrylic polymers such as those of (meth)acrylamides or of alkyl (meth)acrylates such as poly(methyl methacrylate) ("PMMA"), and polymers of alkenylaromatic compounds such as polystyrenes, including syndiotactic polystyrene. The preferred addition polymers for many purposes are polystyrenes and especially the so-called ABS and ASA copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends include, but are not limited to, those comprising PC/ABS, PC/ASA, PC/PBT, PC/PET, PC/polyetherimide, PC/polysulfone, polyester/polyetherimide, PMMA/acrylic rubber, polyphenylene ether-polystyrene, polyphenylene ether-polyamide or polyphenylene ether-polyester. Although the substrate layer may incorporate other thermoplastic polymers, the above-described polycarbonates and/or addition polymers still more preferably constitute the major proportion thereof.

The substrate layer in the coated articles of this invention may also comprise at least one of any thermoset polymer. Suitable thermoset polymer substrates include, but are not limited to, those derived from epoxies, cyanate esters, unsaturated polyesters, diallylphthalate, acrylics, alkyds, phenol-formaldehyde, novolacs, resoles, bismaleimides, PMR resins, melamine-formaldehyde, ureaformaldehyde, benzocyclobutanes, hydroxymethylfurans, and isocyanates. In one embodiment of the invention the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset.

In one embodiment of the invention a thermoplastic or thermoset substrate layer also incorporates at least one filler and/or pigment. Illustrative extending and reinforcing fillers, and pigments include silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers and carbon fibers, as well as colorants such as metal flakes, glass flakes and beads, ceramic particles, other polymer particles, dyes and pigments which may be organic, inorganic or organometallic. In another embodiment the invention encompasses coated articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

Coated articles encompassed by the invention also include those comprising at least one glass layer. Typically any glass layer is a substrate layer, although coated articles comprising a thermally stable polymer coating layer interposed between a glass layer and a substrate layer are also contemplated. Depending upon the nature of coating and glass layers, at least one adhesive interlayer may be beneficially employed between any glass layer and any thermally stable polymer coating layer. The adhesive interlayer may be transparent, opaque or translucent. For many applications it is preferred that the interlayer be optically transparent in nature and generally have a transmission of greater than about 60% and a haze value less than about 3% with no objectionable color.

Metal articles exposed to the environment may exhibit tarnishing, corrosion, or other detrimental phenomena. Therefore, in another embodiment the invention encompasses coated articles comprising at least one metal layer as substrate layer. Representative metal substrates include those comprising steel, aluminum, brass, copper, and other metals or metal-containing articles, which may require protection from the environment. Depending upon the nature of coating and metal layers, at least one adhesive interlayer may be beneficially employed between any metal layer and any thermally stable polymer coating layer.

The articles of this invention are characterized by the usual beneficial properties of the substrate layer, in addition to weatherability as evidenced by improved resistance to ultraviolet radiation and maintenance of gloss, and solvent resistance.

Coated articles which can be made which comprise thermally stable polymers comprising resorcinol arylate polyester chain members include automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

EXAMPLES

The following examples are set forth to provide those of ordinary skill in the art with a detailed description of how the methods claimed herein are carried out and evaluated, and are not intended to limit the scope of what the inventors regard as their invention. Unless indicated otherwise, parts are by weight, temperature is in ° C.

Molecular weights are reported as weight average ($M_w$) molecular weight in grams per mole (g/mole) and were determined by gel permeation chromatography (GPC) using polystyrene (PS) molecular weight standards. Glass Transition Temperatures (Tg) of oligomeric polyarylates were measured by differential scanning calorimetry (DSC).

Chemical resistance of the coating was tested by methyl ethyl ketone (MEK) "double rub" technique. After curing, the coated substrates were allowed to cool to room temperature and remained under ambient conditions for at least 15 hours before being subjected to the methyl ethyl ketone (MEK) double rub or impact tests. MEK double rub tests (MEK DR) were performed under ambient conditions using a two-pound ballpein hammer as weight. The rounded head of the hammer was wrapped in six-layers of grade 10 cheesecloth and soaked with methyl ethyl ketone. The rounded head of the hammer was then placed on the coating and manually moved back and forth across the coating under its own weight. Each back and forth stroke was counted as 1 double rub. When the substrate became exposed the test was ended and the number of double rubs until substrate exposure was recorded. In cases in which the substrate did not become exposed, the tests were terminated after 200 double rubs. Thus, the actual number of MEK double rubs required to effect exposure of the substrate may be higher than the value of 200 recorded.

Impact tests were performed under ambient conditions using a slight variation of ASTM D5420-98a using a Gardner Impact Tester. Direct Impact ("DI") values were recorded when the indentation test was carried out on the coated surface of the test part. Indirect Impact ("II") values were recorded when the indentation test was carried out on the uncoated surface of the substrate. Only steel panels were used to determine the impact measurements.

Examples 1–13 illustrate the methods used to prepare oligomeric polyarylates used in this study. Physical properties of the oligomeric polyarylates were measured and are reported in Table 1. The hydroxy-terminated oligomeric polyarylates prepared in Examples 1–13 possessed varying degrees of crystallinity. The crystallinity of the hydroxy-terminated oligomeric polyarylates did not interfere with the preparation of solvent-borne powder coatings, however, in order to prepare effective dry powder coatings the hydroxy-terminated oligomeric polyarylates had to be converted to an amorphous form prior to formulation. Details are provided herein.

Examples 1–2

Example 1: Preparation of hydroxy-terminated oligomeric polyarylate (70% excess resorcinol). Methylene chloride (60 mL) and resorcinol (10.48 g, 0.0952 mol) were added to a three-neck round bottom flask fitted with a condenser, mechanical stirrer and addition funnel. The heterogeneous mixture of solvent and resorcinol was degassed for 5–10 minutes with nitrogen, and triethylamine (TEA, 33.1 mL, 0.238 mol) was then added. When all of the resorcinol had dissolved, a 35% by weight solution of a 1:1 mixture of isophthaloyl chloride and terephthaloyl chloride (0.056 mole total) in methylene chloride was added via the addition funnel over a period of 10–15 minutes (min) while vigorously stirring the reaction mixture. The reaction mixture was allowed to stir under nitrogen for an additional 45–60 min. The reaction mixture was then quenched with 2N HCl until the apparent pH of the mixture was in a range between about pH 1 and 2. The organic layer was washed three times with water, and the product hydroxy terminated oligomeric polyarylate was precipitated into aqueous methanol (1 part water 5 parts methanol). The volume ratio of the methylene chloride solution to the aqueous methanol antisolvent was about 1 to 15. The product hydroxy terminated oligomeric polyester was dried at 60° C. for 2 days under vacuum and characterized by GPC and DSC. Examples 2 was carried out analogously. Example 2 included 150 mole percent excess resorcinol. Physical data for Examples 1 and 2 are given in Table 1.

Example 3

Preparation of hydroxy-terminated oligomeric polyarylate (200% excess resorcinol). Methylene chloride (36 L) and resorcinol (7928 g, 72 mol) were added into a 50 gallon reactor fitted with a condenser, mechanical stirrer and addition tank. The resultant heterogeneous mixture was degassed for 20 min with nitrogen, and triethylamine (25 L, 180 mol) was added. When the resorcinol had dissolved completely, 13921 grams of a 35% weight percent solution containing 4872.5 grams (24 mol) of a 1 to 1 mixture of isophthaloyl chloride and terephthaloyl chloride in methylene chloride was added using a liquid pump over a period of 20 min. while vigorously stirring the reaction mixture. The reaction mixture was then allowed to stir under nitrogen for an additional 45–60 min. The mixture was then quenched with between about 76 and about 80 liters of 2N HCl to give a mixture with an apparent pH in a range between about 1 and about 2. The organic layer was washed three times with water and the product hydroxy terminated oligomeric polyester was precipitated as described in Examples 1 and 2. The product was dried at 50° C. for 3 days under vacuum and characterized by GPC and DSC. The weight average molecular weight of the product hydroxy-terminated oligomeric polyester was 1790 grams/mole as measured by GPC. The degree of polymerization for this material was measured by NMR and found to be approximately 4 (DP=4). Preparation of hydroxy-terminated oligomeric polyarylates of molecular weight (Mw) of 1420 grams/mole (hereinafter referred to as polyarylate 1420) was carried out analogously.

Examples 4–6

Example 4: Preparation of hydroxy-terminated oligomeric polyarylate with tetraethylene glycol (TEG) soft block (70% excess resorcinol). Tetraethylene glycol (0.72 g, 3.6 mmol), triethyeleneamine (0.62 mL), dimethylaminopyridine (DMAP, 22.6 mg, 0.19 mmol) and methylene chloride (5 mL) were added into a 20 mL round bottom flask (Flask 1) and degassed with nitrogen. To this solution was added 13.1 grams of a 35% by weight solution of a 1 to 1 mixture of isophthaloyl chloride and terephthaloyl chloride in methylene chloride and the mixture was stirred for 15 min under nitrogen. Methylene chloride (190 mL) and resorcinol (31.4 g) were charged to a second three-neck round bottom flask (Flask 2) equipped with a condenser, mechanical stirrer and addition funnel. The heterogeneous mixture was degassed for 5–10 min with nitrogen, and triethylamine (99.3 mL) was then added. When the resorcinol had dissolved completely, the solution contained in Flask1 was added to Flask 2. Subsequently, 74.77 grams of a 35% by weight solution of a 1 to 1 mixture of isophthaloyl chloride and terephthaloyl chloride in methylene chloride was added via the addition funnel over 10–15 min. The reaction mixture was allowed to stir under nitrogen for an additional 45–60 min and was then quenched and the product isolated as in Examples 1 and 2. Examples 5 and 6 were conducted analogously. Data for the product hydroxy terminated oligomeric polyesters of Examples 4–6 are gathered in Table 1.

Examples 7–14

Example 7: Preparation of hydroxy-terminated oligomeric polyarylate with acid soft block (150% excess resorcinol). Methylene chloride (400 mL) and resorcinol (68.9 g, 0.626 mol) were charged to a three-neck round bottom flask fitted with a condenser, mechanical stirrer and addition funnel. The resultant heterogeneous mixture was degassed for 5–10 min with nitrogen, and triethylamine (218 mL) was added. When the resorcinol had dissolved completely, a 35% weight percent solution of a mixture of 50/50 iso/terepthaloyl chloride (0.225 mol, 45.7 g) and sebacoyl chloride (0.025 mol, 5.98 g) in methylene chloride was added via the addition funnel over 10–15 min. The reaction mixture was allowed to stir under nitrogen for an additional 45–60 min. The reaction mixture was quenched and the product hydroxy-terminated oligomeric polyester was isolated as described in Example 1.

The experimental procedure used in Examples 8–14 was essentially the same as that used in Example 7. Data are provided in Table 1.

TABLE 1

| Example | Polymer | Soft block | %-mol soft block* | Mw | Mn | Tg (° C.) |
|---|---|---|---|---|---|---|
| 1 | EA161 | None | — | 4161 | 2219 | 102 |
| 2 | EA160 | None | — | 2746 | 1745 | 93 |
| 3 | EA170 | None | — | 1790 | 705 | 84 |
| 4 | EA164-1 | TEG | 2 | 4914 | 2506 | na |
| 5 | EA164-2 | TEG | 4 | 4598 | 2562 | 97 |
| 6 | EA165 | TEG | 2 | 7006 | 3206 | na |
| 7 | EA181 | Sebacyl | 10 | 3720 | 1832 | 83 |
| 8 | EA182 | Sebacyl | 5 | 3632 | 1928 | 93 |
| 9 | EA184 | Sebacyl | 10 | 3273 | 1785 | 80 |
| 10 | Ea188 | Sebacyl | 10 | 2958 | 1605 | 77 |
| 11 | EA183 | Adipyl | 10 | 3323 | 1763 | 92 |
| 12 | EA189 | Dodecyl | 10 | 2809 | 1348 | 72 |
| 13 | EA190 | Debacyl | 20 | 3335 | 1436 | 60 |
| 14 | EA191 | Adipyl | 10 | 2935 | 1606 | 82 |

*%-mol soft block was calculated with respect to total # of moles of acid chlorides added The following examples 15 to 35 describe the preparation of the solvent-cast powder coating formulations using the oligomeric polyarylate materials synthesized in examples 1 to 14 in the preceding sections.

Examples 15–35

The following coating formulations were prepared and dissolved in suitable solvents for solvent casting. Typically dimethylacetamide and tetrahydrofuran were used as solvents. The solutions of the powder coatings for solvent casting were placed on a laboratory roller for at least 10 minutes to ensure thorough mixing prior to film casting onto the substrate.

The coatings were applied to two different substrates: (i) AL-2024, 4×6 inch aluminum panels and (ii) CRS-1008, B952 pretreated 4×6 inch steel panels. Both substrates were rinsed with acetone and dried before being coated. These substrates were prefabricated sheets procured from Q-PANEL LAB PRODUCTS INC. (for aluminum) and ACT LABORATORIES INC. (for steel).

The formulations were manually applied to the substrates using a 10 mil draw down frame. After application, the coatings were allowed to stand and dry for a short time under ambient conditions before being cured at the specified temperature and time.

The weight percentage of each component used in the formulations for examples 15–35 along with the property data are shown in Table 2.

TABLE 2

| | Wt % | Cure conditions | MEK DR | DI | II |
|---|---|---|---|---|---|
| Examples oligomeric polyarylate/Epoxy | | | | | |
| Example 15 | | | | | |
| EA170 | 78.5% | 30 min. at 120° C. | 200 | 5 | 0 |
| TGIC | 18.6% | 20 min. at 140° C. | 200 | 30 | 0 |
| Epon Resin 2002 | 0.0% | 20 min. at 160° C. | 200 | 20 | 0 |
| BTMAB | 2.0% | | | | |
| Fluorad FC 4430 | 1.0% | | | | |
| Example 16 | | | | | |
| EA 170 | 57.5% | 30 min. at 120° C. | 110 | 10 | 0 |
| TGIC | 10.2% | 20 min. at 140° C. | 200 | 40 | 5 |
| Epon Resin 2002 | 29.4% | 20 min. at 160° C. | 200 | 60 | 40 |
| BTMAB | 1.9% | | | | |
| Fluorad FC 4430 | 1.0% | | | | |
| Example 17 | | | | | |
| EA 170 | 45.4% | 30 min. at 120° C. | 52 | 30 | 10 |
| TGIC | 5.4% | 20 min. at 140° C. | 200 | 50 | 40 |
| Epon Resin 2002 | 46.3% | 20 min. at 160° C. | 200 | 70 | 50 |
| BTMAB | 1.9% | | | | |
| Fluorad FC 4430 | 1.0% | | | | |
| Example 18 | | | | | |
| EA 170 | 37.5% | 30 min. at 120° C. | 26 | 90 | 20 |
| TGIC | 2.2% | 20 min. at 140° C. | 200 | 120 | 90 |
| Epon Resin 2002 | 57.4% | 20 min. at 160° C. | 200 | 80 | 50 |
| BTMAB | 2.0% | | | | |
| Fluorad FC 4430 | 1.0% | | | | |
| Example 19 | | | | | |
| EA 170 | 31.9% | 30 min. at 120° C. | 18 | 100 | 50 |
| TGIC | 0.0% | 20 min. at 140° C. | 199 | 130 | 100 |
| Epon Resin 2002 | 65.2% | 20 min. at 160° C. | 200 | 70 | 70 |
| BTMAB | 1.9% | | | | |
| Fluorad FC 4430 | 1.0% | | | | |

TABLE 2-continued

| | Wt % | Cure conditions | MEK DR | DI | II |
|---|---|---|---|---|---|
| *Example 20* | | | | | |
| EA 170 | 73.7% | 20 min. at 140° C. | 200 | 20 | 0 |
| TGIC | 0.0% | 20 min. at 160° C. | 200 | 100 | 40 |
| RDGE | 23.3% | | | | |
| BTMAB | 2.0% | | | | |
| Fluorad FC 4430 | 1.0% | | | | |
| *Example 21* | | | | | |
| EA 170 | 74.6% | 20 min. at 140° C. | 200 | 30 | 0 |
| TGIC | 4.4% | 20 min. at 160° C. | 200 | 100 | 160 |
| RDGE | 17.8% | | | | |
| BTMAB | 2.1% | | | | |
| Fluorad FC 4430 | 1.1% | | | | |
| *Example 22* | | | | | |
| EA 170 | 75.8% | 20 min. at 140° C. | 200 | 30 | 0 |
| TGIC | 9.0% | 20 min. at 160° C. | 200 | 70 | 10 |
| RDGE | 12.1% | | | | |
| BTMAB | 2.1% | | | | |
| Fluorad FC 4430 | 1.1% | | | | |
| *Example 23* | | | | | |
| EA 170 | 77.0% | 20 min. at 140° C. | 200 | 30 | 0 |
| TGIC | 13.7% | 20 min. at 160° C. | 200 | 60 | 20 |
| RDGE | 6.1% | | | | |
| BTMAB | 2.2% | | | | |
| Fluorad FC 4430 | 1.0% | | | | |
| *Example oligomeric polyarylate/Isocyanate Example 24* | | | | | |
| EA 170 | 57.6% | 30 min. at 120° C. | 70 | | |
| IPDI-Trimer | 41.1% | | | | |
| Triethylamine | 1.3% | | | | |
| *Example oligomeric polyarylate/Acrylate Example 25* | | | | | |
| EA 170 | 39.2% | 20 min. at 160° C. | 200 | 10 | 0 |
| Fineclad A-229-30-A | 57.8% | | | | |
| BTMAB | 2.0% | | | | |
| Fluorad FC 4430 | 1.0% | | | | |
| *Example oligomeric polyarylate/PE/Epoxy Example 26* | | | | | |
| POLYARYLATE 1420 | 6.2% | 20 min. at 160° C. | 60 | 160 | 160 |
| Fine Clad M8950 | 84.1% | | | | |
| TGIC | 7.7% | | | | |
| BTMAB | 1.0% | | | | |
| Fluorad FC 4430 | 1.0% | | | | |
| *Example 27* | | | | | |
| POLYARYLATE 1420 | 16.1% | 20 min. at 160° C. | 168 | 160 | 160 |
| Fine Clad M8950 | 71.9% | | | | |
| TGIC | 10.0% | | | | |
| BTMAB | 1.0% | | | | |
| Fluorad FC 4430 | 1.0% | | | | |
| *Example 28* | | | | | |
| POLYARYLATE 1420 | 19.9% | 20 min. at 160° C. | 100 | 160 | 160 |
| Fine Clad M8950 | 67.2% | | | | |
| TGIC | 10.9% | | | | |
| BTMAB | 1.0% | | | | |
| Fluorad FC 4430 | 1.0% | | | | |
| *Example 29* | | | | | |
| POLYARYLATE 1420 | 24.6% | 20 min. at 160° C. | 200 | 160 | 160 |
| Fine Clad M8950 | 61.5% | | | | |
| TGIC | 11.9% | | | | |
| BTMAB | 1.0% | | | | |
| Fluorad FC 4430 | 1.0% | | | | |

TABLE 2-continued

| | Wt % | Cure conditions | MEK DR | DI | II |
|---|---|---|---|---|---|
| Example 30 | | | | | |
| POLYARYLATE 1420 | 28.3% | 20 min. at 160° C. | 200 | 160 | 130 |
| Fine Clad M8950 | 56.9% | | | | |
| TGIC | 12.8% | | | | |
| BTMAB | 1.0% | | | | |
| Fluorad FC 4430 | 1.0% | | | | |
| Example 31 | | | | | |
| POLYARYLATE 1420 | 33.3% | 20 min. at 160° C. | 200 | 120 | <100 |
| Fine Clad M8950 | 50.7% | | | | |
| TGIC | 14.0% | | | | |
| BTMAB | 1.0% | | | | |
| Fluorad FC 4430 | 1.0% | | | | |
| Comparative Example 1 | | | | | |
| Fine Clad M8950 | 91.6% | 20 min. at 160° C. | 37 | 160 | 160 |
| TGIC | 6.3% | | | | |
| BTMAB | 1.1% | | | | |
| Fluorad FC 4430 | 1.0% | | | | |
| Example oligomeric polyarylate/Epoxy/Anhydride | | | | | |
| Example 32 | | | | | |
| EA 170 | 61.1% | 30 min. at 120° C. | 80 | 20 | 0 |
| Phthalic anhydride | 6.7% | 20 min. at 140° C. | 200 | 20 | 40 |
| RDGE | 29.2% | 20 min. at 160° C. | 200 | 100 | 50 |
| BTMAB | 2.0% | | | | |
| Fluorad FC 4430 | 1.0% | | | | |
| Example 33 | | | | | |
| EA 170 | 23.7% | 30 min. at 120° C. | 200 | | |
| Epon Resin 2002 | 69.8% | 30 min. at 140° C. | 200 | | |
| Oxydiphthalic anhydride | 5.8% | 20 min. at 160° C. | 200 | | |
| N-Methylimidazole | 1.0% | | | | |
| Fluorad FC 4430 | 0.7% | | | | |
| Example oligomeric polyarylate/Polyphenol/Epoxy | | | | | |
| Example 34 | | | | | |
| EA 170 | 25.1% | 20 min. at 160° C. | 200 | 80 | 60 |
| DEH 82 | 17.6% | | | | |
| TGIC | 5.9% | | | | |
| Epon Resin 2002 | 49.8% | | | | |
| BTMAB | 0.6% | | | | |
| Fluorad FC 4430 | 1.0% | | | | |
| Example oligomeric polyarylate/Epoxy/Isocyanate | | | | | |
| Example 35 | | | | | |
| EA 170 | 47.8% | 20 min. at 180° C. | 200 | 10 | 0 |
| Crelan NI2 | 37.5% | | | | |
| TGIC | 11.2% | | | | |
| BTMAB | 2.6% | | | | |
| Fluorad FC 4430 | 1.0% | | | | |

Legend:
Wt %—Weight percent non-volatile components
MEK DR—Methyl ethyl ketone double rubs
DI—Direct impact on Gardner impacter
II—Indirect impact on Gardner impacter
EA 170—Polyarylate oligomers Mw =1790
TGIC—Triglycidylisocyanurate
Epon Resin 2002—BisphenolA/epichlorohydrin copolymer, glycidyl ether end-capped
BTMAB—Benzyltrimethylammonium bromide
Fluorad FC 4430—Fluorosurfactant by 3M (structure unknown)
RDGE—Resorcinol diglycidyl ether
IPDI-Trimer—Isocyanurate of isophorone diisocyanate (Vestanat T 1890)
Fineclad A-229-30-A—Polyacrylate containing glycidyl methacrylate
POLYARYLATE 1420—Mw = 1420
Fine Clad M8950—Polyester containing free carboxylic acid groups
DEH 82—BisphenolA/epichlorohydrin copolymer, Bisphenol A end-capped
Crelan NI2—Caprolactam blocked polyisocyanate Examples 15–35 show formulations and physical properties for powder coatings prepared using hydroxy-terminated oligomeric polyarylates with epoxy, isocyanate, acrylate, polyester, anhydride, and polyphenol materials.

Comparative Example 1 is the formulation suggested by the literature. Similar formulations made including the oligomeric polyarylate EA170 are shown in Examples 26–30. The chemical resistance of the of the coatings prepared in Examples 26–30 are shown to be superior in performance to that of Comparative Example 1.

Coating formulations were prepared from soft-block-modified oligomeric polyarylate and tested. The formulations along with the test results are given in Table 3. The soft-block-modified oligomeric polyarylates may be used in formulations similar to the ones already described in Examples 15–35.

TABLE 3

| Soft-block-modified oligomeric polyarylate | Wt % | Cure cond. | MEK DR | DI | II |
|---|---|---|---|---|---|
| Example 36 | | | | | |
| EA 181 | 54.3% | 30 min. at 120° C. | 20 | 20 | 0 |
| Epon Resin 2002 | 42.6% | 20 min. at 140° C. | 145 | 80 | 90 |
| BTMAB | 2.1% | 20 min. at 160° C. | 200 | 80 | 60 |
| Fluorad FC 4430 | 1.0% | | | | |
| Example 37 | | | | | |
| EA 182 | 55.5% | 30 min. at 120° C. | 23 | 30 | 0 |
| Epon Resin 2002 | 41.5% | 20 min. at 140° C. | 113 | 50 | 80 |
| BTMAB | 1.9% | 20 min. at 160° C. | 200 | 80 | 30 |
| Fluorad FC 4430 | 1.1% | | | | |
| Example 38 | | | | | |
| EA 183 | 53.4% | 30 min. at 120° C. | 14 | 30 | 0 |
| Epon Resin 2002 | 43.6% | 20 min. at 140° C. | 160 | 120 | 90 |
| BTMAB | 2.0% | 20 min. at 160° C. | 200 | 100 | 10 |
| Fluorad FC 4430 | 1.0% | | | | |
| Example 39 | | | | | |
| EA 184 | 53.7% | 30 min. at 120° C. | 21 | 50 | 0 |
| Epon Resin 2002 | 43.3% | 20 min. at 140° C. | 125 | 70 | 30 |
| BTMAB | 2.0% | 20 min. at 160° C. | 200 | 80 | 100 |
| Fluorad FC 4430 | 1.0% | | | | |
| Example 40 | | | | | |
| EA 188 | 50.9% | 30 min. at 120° C. | 25 | 30 | 0 |
| Epon Resin 2002 | 45.9% | 20 min. at 140° C. | 200 | 50 | 10 |
| BTMAB | 2.0% | 20 min. at 160° C. | 200 | 50 | 30 |
| Fluorad FC 4430 | 1.2% | | | | |
| Example 41 | | | | | |
| EA 189 | 47.0% | 30 min. at 120° C. | 45 | 30 | 0 |
| Epon Resin 2002 | 50.0% | 20 min. at 140° C. | 200 | 80 | 60 |
| BTMAB | 2.0% | 20 min. at 160° C. | 200 | 100 | 30 |
| Fluorad FC 4430 | 1.0% | | | | |
| Example 42 | | | | | |
| EA 190 | 48.4% | 30 min. at 120° C. | 55 | 30 | 0 |
| Epon Resin 2002 | 48.6% | 20 min. at 140° C. | 150 | 80 | 20 |
| BTMAB | 2.0% | 20 min. at 160° C. | 200 | 80 | 80 |
| Fluorad FC 4430 | 1.0% | | | | |
| Example 43 | | | | | |
| EA 191 | 51.1% | 30 min. at 120° C. | 30 | 20 | 0 |
| Epon Resin 2002 | 46.0% | 20 min. at 140° C. | 175 | 50 | 0 |
| BTMAB | 2.0% | 20 min. at 160° C. | 200 | 80 | 30 |
| Fluorad FC 4430 | 1.0% | | | | |

Comparative Examples 2–6

Additional Comparative Examples were carried out using coating formulations suggested in the literature. The formulations and results of the tests done on the coatings made from such formulations are given in Table 4. It was observed that the formulations disclosed in examples 15–43 consistently showed better performance in the MEK double rub test.

TABLE 4

| Comparative example 2 | | | | | |
|---|---|---|---|---|---|
| DDDA | 17.8% | 20 min. at 150° C. | 25 | 160 | 160 |
| Fine-Clad A-229-30-A | 80.4% | | | | |
| Modaflow | 1.0% | | | | |
| Benzoin | 0.8% | | | | |
| Comparative example 3 | | | | | |
| DEH 80 | 25.7% | 30 min. at 120° C. | 22 | 130 | 160 |
| Epon Resin 2002 | 72.6% | 20 min. at 160° C. | 25 | 160 | 160 |
| Modaflow | 1.0% | | | | |
| Benzoin | 0.8% | | | | |
| Comparative example 4 | | | | | |
| Albester 5180 | 93.7% | 30 min. at 120° C. | 5 | 160 | 160 |
| TGIC | 4.6% | | | | |
| Modaflow | 1.0% | | | | |
| Benzoin | 0.8% | | | | |
| Comparative example 5 | | | | | |
| Crylcoat 632 | 93.6% | 10 min. at 200° C. | 5 | 160 | 160 |
| TGIC | 4.7% | | | | |
| Modaflow | 1.0% | | | | |
| Benzoin | 0.8% | | | | |
| Comparative example 6 | | | | | |
| Rucote 104 | 63.0% | 20 min. at 185° C. | 50 | 160 | 160 |
| Crelan NI2 | 35.3% | 12 min. at 200° C. | 90 | 160 | 160 |
| Modaflow | 1.0% | | | | |
| Benzoin | 0.8% | | | | |

Examples 44–47

In Examples 44–47, dry powder coating formulations were prepared using the oligomeric polyarylate (EA 170) synthesized in Example 3. The dry powder coating formulations were prepared as follows.

The crystalline polyarylate oligomer was converted into an amorphous form. It should be noted the process described herein for preparation of the oligomeric polyarylate may impart crystallinity to the product oligomeric polyarylate. Optimal performance of the dry powder coating formulations of the present invention is achieved when the polyarylate is in an amorphous form.

In order to remove the crystallinity, the oligomeric polyarylate was melt extruded in a 16 mm Prism extruder. Melting the oligomeric polyarylate using this technique successfully removed crystallinity from the material as determined by DSC (Differential Scanning Calorimetry). The processing conditions for the extrusion are listed in table 5.

TABLE 5

| Processing Parameter | Processing Condition |
|---|---|
| Extrusion Temperature | 230° C. |
| RPM | 50 |
| Torque | >25% |
| Collection Medium | Liquid Nitrogen |

Four different formulations were prepared (See Examples 44–47, Table 7) using the amorphous form of the polyarylate oligomer EA 170 which had been pre-extruded in to remove crystallinity. The four oligomeric polyarylate-containing clear coat powder coating formulations were prepared on a 400 gram scale by dry blending the amorphous polyarylate and other components in a Henschel Dry Mixer using the standardized medium shear blade configuration. This dry blending was performed at 2500 rpm for 3 min. The dry powder produced was then melt-mixed in a 16 mm Prism extruder. The extrusion conditions are given in Table 6. The dry powders were then fed into the extruder using a RETSCH vibratory feeder and the product extrudate was pinched through a take-up roller and collected in a Dewar flask containing liquid nitrogen.

TABLE 6

| Formulation | Die | Zone 4 | Zone 3 | Zone 2 | Zone 1 | RPM | Torque (N · m) |
|---|---|---|---|---|---|---|---|
| Example 44 | 90 | 95 | 110 | 105 | 90 | 225 | 14 |
| Example 45 | 90 | 90 | 95 | 95 | 90 | 225 | 17 |
| Example 46 | 85 | 90 | 95 | 95 | 90 | 225 | 18 |
| Example 47 | 85 | 90 | 95 | 90 | 90 | 225 | 16 |

The extrudate was then ground and sieved to produce the desired polyarylate-containing clear coat powder coating formulation. Grinding was accomplished by first converting the extrudate to a coarse powder using the Henschel Dry Mixer with the normal shear blade configuration at 2500 rpm for 30 sec. Next, the coarse powder was passed through a Retsch ZM-100 hammer mill using a 200-micron ring sieve. This hammer mill uses a cyclone to pull off the "fines" created during the grinding process. Finally, the powders were passed through a 140-micron sieve mounted in a VORT-SIV vibratory siever. This final step screened out large particles. This powder was then electrostatically sprayed onto steel and aluminum panels and cured to provide test coatings.

TABLE 7

| | Wt % | Cure cond. | MEK DR | DI | II |
|---|---|---|---|---|---|
| Example 44 | | | | | |
| EA 170 | 77.9% | 30 min. at 120° C. | 200 | 30 | 0 |
| TGIC | 18.4% | 20 min. at 140° C. | 200 | 20 | 0 |
| Epon Resin 2002 | 0.0% | 20 min. at 160° C. | 200 | 20 | 0 |
| BTMAB | 1.9% | | | | |
| Modaflow | 1.0% | | | | |
| Benzoin | 0.7% | | | | |
| Example 45 | | | | | |
| EA 170 | 45.0% | 30 min. at 120° C. | 5 | 10 | 0 |
| TGIC | 5.3% | 20 min. at 140° C. | 200 | 20 | 0 |
| Epon Resin 2002 | 46.0% | 20 min. at 160° C. | 200 | 20 | 0 |
| BTMAB | 1.9% | | | | |
| Modaflow | 1.0% | | | | |
| Benzoin | 0.8% | | | | |

TABLE 7-continued

| | Wt % | Cure cond. | MEK DR | DI | II |
|---|---|---|---|---|---|
| Example 46 | | | | | |
| EA 170 | 37.1% | 30 min. at 120° C. | 16 | 10 | |
| TGIC | 2.2% | 20 min. at 140° C. | 175 | 20 | |
| Epon Resin 2002 | 57.0% | 20 min. at 160° C. | 200 | 20 | |
| BTMAB | 1.9% | | | | |
| Modaflow | 1.0% | | | | |
| Benzoin | 0.7% | | | | |
| Example 47 | | | | | |
| EA 170 | 31.6% | 30 min. at 120° C. | 10 | 10 | |
| TGIC | 0.0% | 20 min. at 140° C. | 100 | 30 | |
| Epon Resin 2002 | 64.7% | 20 min. at 160° C. | 200 | 30 | |
| BTMAB | 1.9% | | | | |
| Modaflow | 1.0% | | | | |
| Benzoin | 0.7% | | | | |
| Comparative Example 7 | | | | | |
| DDDA | 17.8% | 20 min. at 150° C. | 15 | 5 | 0 |
| Fine-Clad A-229-30-A | 80.4% | | | | |
| Modaflow | 1.0% | | | | |
| Benzoin | 0.8% | | | | |
| Comparative Example 8 | | | | | |
| DEH 80 | 25.7% | 30 min. at 120° C. | 20 | 160 | 160 |
| Epon Resin 2002 | 72.6% | | | | |
| Modaflow | 1.0% | | | | |
| Benzoin | 0.8% | | | | |
| Comparative Example 9 | | | | | |
| Albester 5180 | 93.7% | 30 min. at 120° C. | 22 | 20 | 0 |
| TGIC | 4.6% | | | | |
| Modaflow | 1.0% | | | | |
| Benzoin | 0.8% | | | | |
| Comparative Example 10 | | | | | |
| Crylcoat 632 | 93.6% | 10 min. at 200° C. | 9 | 10 | 0 |
| TGIC | 4.7% | | | | |
| Modaflow | 1.0% | | | | |
| Benzoin | 0.8% | | | | |
| Comparative Example 11 | | | | | |
| Rucote 104 | 63.0% | 20 min. at 185° C. | 50 | 100 | 80 |
| Crelan NI2 | 35.3% | 12 min. at 200° C. | 75 | 150 | 40 |
| Modaflow | 1.0% | | | | |
| Benzoin | 0.8% | | | | |

Comparative examples 7–11 were carried out using the same formulations used in Comparative Examples 2–6, but in dry powder form. The chemical resistance of Examples 44–47 were compared to Comparative examples 7–11 by comparing the MEK double rub test values. The dry powder coatings of Examples 44–47 showed enhanced performance relative to Comparative Examples 7–11.

Examples 48–60

Additional Solution Polymerization Studies

Examples 48–60 were conducted to explore the effect of water content variation on the reaction of dihydroxy-substituted aromatic compounds with diacid chlorides using the method of the present invention. The following general procedure was used.

Methylene chloride, or a mixture of methylene chloride and triethylamine (TEA) was shaken with an amount of dionized water in excess of that needed to fully saturate the methylene chloride with water. After shaking, the mixture comprising a water layer and a methylene chloride layer saturated with water was allowed to stand overnight. The methylene chloride layer was then separated and used as the reaction solvent in example employing water saturated methylene chloride. In some Examples a desired amount of water was added directly to a mixture of methylene chloride and triethylamine in the amounts indicated in Table 8.

A one liter reactor equipped with a condenser, an addition funnel, and an agitator was charged with 200 mL of dry methylene chloride, 85.2 mL (0.61 mol) of TEA, and 26.89 g (0.24 mol) of resorcinol. After several minutes of stirring the resorcinol had completely dissolved. A methylene chloride solution of diacid chloride (DAC) (108.6 g, a 1:1 mixture of iso- and terephthaloyl chloride) having a total volume of about 100 mL containing about 0.20 moles of diacid chloride was added via the addition funnel over a period of about 10 minutes while the mixture was vigorously stirred. Following the diacid chloride addition, the reaction mixture was stirred for 15 minutes, and then 2N HCl solution (110 mL) was added and the mixture was stirred for 10 minutes. The organic layer was then sampled to ascertain the molecular weight of the product polyarylate. Physical data for polyarylates produced using this general method are given in Table 8. In Tables 8 and 9 the term "RS" refers to resorcinol. The term "dry" methylene chloride indicates the Reagent-Grade solvent from a freshly opened container.

TABLE 8

Polyarylate Formation In Dry Methylene Chloride

| Example | Mole DAC | Mole RS | Mole TEA | RS/DAC (mole) | TEA/RS (mole) | $M_w$ | $M_n$ | Conditions |
|---|---|---|---|---|---|---|---|---|
| 48 | 0.20 | 0.220 | 0.500 | 1.100 | 2.27 | 15122 | 6262 | dry CH2Cl2 |
| 49 | 0.20 | 0.229 | 0.571 | 1.143 | 2.50 | 17837 | 6407 | dry CH2Cl2 |
| 50 | 0.20 | 0.229 | 0.571 | 1.143 | 2.50 | 16194 | 6319 | dry CH2Cl2 |
| 51 | 0.20 | 0.244 | 0.501 | 1.222 | 2.05 | 10297 | 4372 | dry CH2Cl2 |
| 52 | 0.20 | 0.244 | 0.501 | 1.222 | 2.05 | 9511 | 4067 | dry CH2Cl2 |
| 53 | 0.20 | 0.244 | 0.612 | 1.222 | 2.50 | 7472 | 3338 | dry CH2Cl2 |
| 54 | 0.20 | 0.271 | 0.677 | 1.353 | 2.50 | 6225 | 2758 | dry CH2Cl2 |
| 55 | 0.20 | 0.271 | 0.677 | 1.353 | 2.50 | 7876 | 3219 | dry CH2Cl2 |

Examples 56–60 were carried out as described for Examples 48–55 with the exception that each of the reactions (apart from Example 56) was run in a system comprising varying amounts of water. In each of Examples 56–60 the amount of resorcinol (RS) used was 0.244 moles and the amount of triethylamine (TEA) used was 0.612 moles. Data on reaction conditions and product polyarylate are presented in Table 9.

TABLE 9

Polyarylate Formation In Water-Treated Methylene Chloride

| Example | Mole DAC | RS/DAC (mole) | $M_w$ | $M_n$ | Conditions | Mole % OH by NMR |
|---|---|---|---|---|---|---|
| 56 | 0.20 | 1.222 | 3311 | 7880 | dry CH2Cl2 | 94.7 |
| 57 | 0.20 | 1.222 | 3452 | 8257 | CH2Cl2 saturated with H2O | 95.2 |
| 58 | 0.20 | 1.222 | 3957 | 8648 | CH2Cl2/TEA saturated with H2O | 91.5 |
| 59 | 0.20 | 1.222 | 5193 | 13859 | 5 wt % H2O added | 89.3 |
| 60 | 0.21 | 1.184 | 7507 | 20150 | 16.6 wt % H2O added | — |

The data indicate that while the best molecular control is achieved in "dry" systems (Compare Examples 56 with Examples 57–60), the presence of water does not begin to have a dramatic effect upon reaction outcome as measured by $M_n$ and $M_w$ until a significant amount of water is present. Thus, the methylene chloride used in the preparation of polyarylates according to the method of the present invention without recourse to extraordinary precautions being taken to dry the methylene chloride prior to its use. The ability to employ methylene chloride which is saturated with water is especially advantageous in manufacturing settings wherein solvent streams are purified by contact with water, and recycled and reused thereafter.

The invention has been described in detail with particular reference to preferred embodiments thereof, but it will be understood by those skilled in the art that variations and modifications can be effected within the spirit and scope of the invention.

What is claimed is:

1. A coating composition comprising components A, B and optionally C
   (i) component A comprising at least one polyarylate comprising structural units having formula I

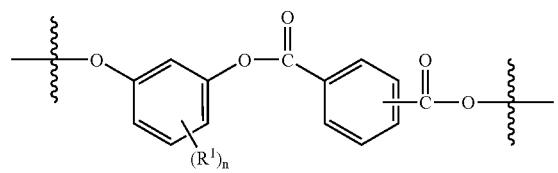

Formula (I)

wherein $R^1$ is independently at each occurrence a $C_1$–$C_{12}$ alkyl radical and n is 0–3, said polyarylate further comprising phenolic hydroxy groups;

(ii) component B comprising at least one "organic species" comprising one or more functional groups, said functional groups being chemically reactive with the phenolic hydroxy groups of the polyarylate of component A; and optionally (iii) component C one or more catalysts which promote chemical reaction between the polyarylate of component A and the "organic species" of component B, wherein component B comprises at least one melamine resin, urea formaldehyde resin, or a combination thereof.

2. The coating composition according to claim 1 further comprising a co-resin.

3. The coating composition according to claim 1 wherein the concentration of component A is at about 1 to about 99 percent by weight of the total weight of the coating composition.

4. The coating composition according to claim 1 wherein the concentration of component B is at about 99 to about 1 percent by weight of the total weight of the coating composition.

5. The coating composition according to claim 1 wherein the concentration of component C is at about 0.00001 to about 10 percent by weight of the total weight of the coating composition.

6. The coating composition according to claim 1 wherein component A further comprises structural units having formula VIII:

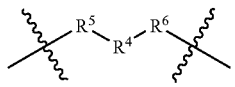

Formula (VIII)

wherein $R^4$ is a $C_2$–$C_{100}$ aliphatic radial, or a $C_4$–$C_{20}$ cycloaliphatic radical and $R^5$ and $R^6$ each independently represent a bond

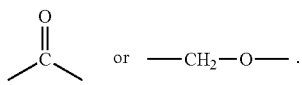

7. The coating composition according to claim 6 wherein said $C_2$–$C_{100}$ aliphatic radical $R^4$ comprises structural units having formula IX

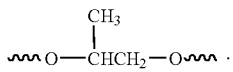

Formula (IX)

8. The coating composition according to claim 6 wherein said $C_2$–$C_{100}$ aliphatic radical $R^4$ comprises structural units having formula X

  Formula (X).

9. The coating composition according to claim 6 wherein the concentration of the structural unit of formula VIII in component A is in a range between about 0.01 to about 50 percent by weight of the total weight of the coating composition.

10. The coating composition according to claim 1 wherein said polyarylate has a number average molecular weight in a range between about 2000 and about 5000 grams per mole.

11. The coating composition according to claim 1 wherein said polyarylate has a number average molecular weight in a range between about 500 and about 2500 grams per mole.

12. The coating composition according to claim 1 wherein the catalyst is selected from the group consisting of tertiary amines, quaternary ammonium salts, quaternary phosphonium salts, Lewis acids, and mixtures thereof.

13. The coating composition according to claim 1 further comprising at least one solvent.

14. The coating composition according to claim 13 wherein said solvent is selected from the group consisting of amides, esters, ethers, ketones, alcohols, aromatics, halogenated solvents and mixtures thereof.

15. The coating composition according to claim 14 wherein said solvent is selected from the group consisting of dimethylacetamide, tetrahydrofuran, and mixtures thereof.

16. The coating composition according to claim 1 further comprising water.

17. The coating composition according to claim 16, said coating composition being a dispersion in water.

18. The coating composition according to claim 1 further comprising at least one additive selected from the group consisting of inorganic pigments, organic pigments, inorganic fillers, and organic fillers.

19. A powder coating composition comprising components A, B and optionally C (i) component A comprising at least one polyarylate comprising structural units having formula I

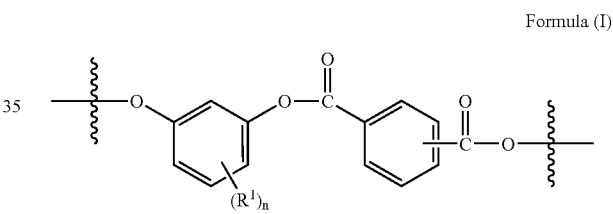

Formula (I)

wherein $R^1$ is independently at each occurrence a $C_1$–$C_{12}$ alkyl radical and n is 0–3, said polyarylate further comprising phenolic hydroxy groups;

(ii) component B comprising at least one "organic species" comprising one or more functional groups, said functional groups being chemically reactive with the phenolic hydroxy groups of the oligomeric polyarylate of component A; and optionally (iii) component C one or more catalysts which promote chemical reaction between the polyarylate of component A and the "organic species" of component B, wherein component B comprises at least one melamine resin, urea formaldehyde resin, or a combination thereof.

20. The powder coating composition according to claim 19 further comprising a co-resin.

21. The powder coating composition according to claim 19 wherein the concentration of component A is at about 1 to about 99 percent by weight of the total weight of the powder coating composition.

22. The powder coating composition according to claim 19 wherein the concentration of component B is at about 99 to about 1 percent by weight of the total weight of the powder coating composition.

23. The powder coating composition according to claim 19 wherein the concentration of component C is at about 0.0001 to about 10 percent by weight of the total weight of the powder coating composition.

24. The powder coating composition according to claim 19 wherein component A further comprises structural units having formula VIII:

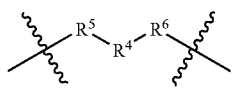
Formula (VIII)

wherein $R^4$ a $C_2$–$C_{100}$ aliphatic radial, or a $C_4$–$C_{20}$ cycloaliphatic radical and $R^5$ and $R^6$ each independently represent a bond,

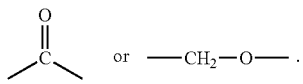

25. The powder coating composition according to claim 24 wherein said $C_2$–$C_{100}$ aliphatic radical $R^4$ comprises structural units having formula IX

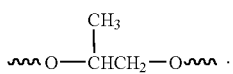
Formula (IX)

26. The powder coating composition according to claim 24 wherein said $C_2$–$C_{100}$ aliphatic radical $R^4$ comprises structural units having formula X:

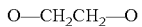  Formula (X).

27. The powder coating composition according to claim 24 wherein the concentration of the structural unit of formula VIII in component A is in a range between about 0.01 to about 50 percent by weight of the total weight of the powder coating.

28. The powder coating composition according to claim 19 wherein said polyarylate is a polyarylate oligomer having a number average molecular weight in a range between about 2000 and about 5000 grams per mole.

29. The powder coating composition according to claim 28 wherein said oligomeric polyarylate is amorphous.

30. The powder coating composition according to claim 28 wherein said oligomeric polyarylate is a crystalline solid.

31. The powder coating composition according to claim 19 wherein said polyarylate is a polyarylate oligomer having a number average molecular weight in a range between about 500 and about 2500 grams per mole.

32. The powder coating composition according to claim 19 wherein the catalyst is selected from the group consisting of tertiary amines, quaternary ammonium salts, quaternary phosphonium salts, Lewis acids, and mixtures thereof.

33. A coated article comprising:
a substrate layer comprising at least one thermoplastic polymer, thermoset polymer, a cellulosic material, glass or metal, and
at least one cured coating layer thereon, said coating comprising the cure-reaction products of components A, B and C:
(i) component A comprising at least one oligomeric polyarylate, said polyarylate comprising structural units having formula I

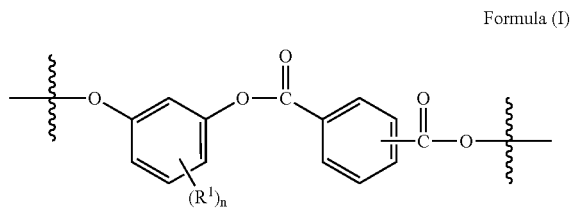
Formula (I)

wherein $R_1$ is independently at each occurrence a $C_1$–$C_{12}$ alkyl radical and n is 0–3, said oligomeric polyarylate further comprising hydroxy terminal groups;
(ii) component B comprising at least one "organic species" comprising one or more functional groups, said functional groups being chemically reactive with the reactive hydroxy terminal groups of the oligomeric polyarylate of component A; and
(iii) at least one catalyst which promotes the reaction between the oligomeric polyarylate of component A and the "organic species" of component B,
wherein component B comprises at least one melamine resin, urea formaldehyde resin, or a combination thereof.

34. The coated article according to claim 33 wherein the coating further comprises a co-resin.

35. The coated article according to claim 33 wherein component A further comprises structural units having formula VIII:

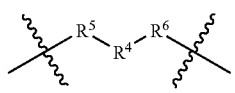
Formula (VIII)

wherein $R^4$ a $C_2$–$C_{100}$ aliphatic radial, or a $C_4$–$C_{20}$ cycloaliphatic radical and $R^5$ and $R^6$ each independently represent a bond,

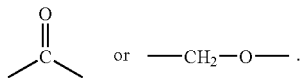

* * * * *

UNITED STATES PATENT AND TRADEMARK OFFICE
CERTIFICATE OF CORRECTION

PATENT NO.         : 7,214,432 B2
APPLICATION NO.    : 10/676892
DATED              : May 8, 2007
INVENTOR(S)        : Merfeld et al.

It is certified that error appears in the above-identified patent and that said Letters Patent is hereby corrected as shown below:

In Column 8, Line 51, please replace "N,N-dimethylormaide" to --N,N-dimethylformamide--.

Signed and Sealed this

Thirtieth Day of October, 2007

JON W. DUDAS
*Director of the United States Patent and Trademark Office*